United States Patent
Oshima

(10) Patent No.: US 11,939,899 B2
(45) Date of Patent: Mar. 26, 2024

(54) VEHICLE REAR STRUCTURE

(71) Applicant: HONDA MOTOR CO., LTD., Tokyo (JP)

(72) Inventor: Takuya Oshima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 17/666,593

(22) Filed: Feb. 8, 2022

(65) Prior Publication Data

US 2022/0260003 A1      Aug. 18, 2022

(30) Foreign Application Priority Data

Feb. 15, 2021   (JP) ................................ 2021-021799

(51) Int. Cl.
  *F01N 13/18* (2010.01)
(52) U.S. Cl.
  CPC ................................ *F01N 13/1822* (2013.01)
(58) Field of Classification Search
  CPC .... F01N 13/1822; F01N 13/082; B60R 13/04
  See application file for complete search history.

(56) References Cited

U.S. PATENT DOCUMENTS

| | | | | |
|---|---|---|---|---|
| 2,902,102 | A * | 9/1959 | Gorman | B60R 19/48 180/309 |
| 7,032,702 | B2 * | 4/2006 | Rinklin | F01N 13/1805 181/227 |
| 8,671,575 | B2 * | 3/2014 | Yoo | B60R 19/023 228/262.5 |
| 10,618,476 | B2 * | 4/2020 | Kornblatt | B60R 19/48 |
| 2004/0163874 | A1 * | 8/2004 | Rinklin | F01N 13/082 180/309 |
| 2008/0036222 | A1 | 2/2008 | Iwamoto et al. | |
| 2018/0319357 | A1 * | 11/2018 | Baluch | F01N 13/082 |
| 2018/0361963 | A1 | 12/2018 | Tanaka et al. | |

(Continued)

FOREIGN PATENT DOCUMENTS

| | | |
|---|---|---|
| CN | 101121381 | 2/2008 |
| CN | 109080448 | 12/2018 |

(Continued)

OTHER PUBLICATIONS

English Translation of JP 2014-144740 (Year: 2014).*

(Continued)

*Primary Examiner* — Anthony Ayala Delgado
(74) *Attorney, Agent, or Firm* — Amin, Turocy & Watson, LLP

(57) ABSTRACT

A vehicle rear portion includes a resin rear exterior member, a metal exhaust finisher, and a reinforcing block. The rear exterior member is provided at a rear portion of a vehicle body. The exhaust finisher is provided at a terminating end portion of an exhaust pipe. The reinforcing block is fixed to the exhaust finisher and attached to the rear exterior member. The reinforcing block has an upper side portion that straddles an upper side of the exhaust finisher in a vehicle width direction, an inner side portion that extends downward from an inner region of the upper side portion in the vehicle width direction, and an outer side portion that extends downward from an outer region of the upper side portion in the vehicle width direction.

8 Claims, 7 Drawing Sheets

(56) References Cited

U.S. PATENT DOCUMENTS

| | | | |
|---|---|---|---|
| 2019/0263332 A1* | 8/2019 | Kornblatt | ............... B60R 13/04 |
| 2020/0298914 A1 | 9/2020 | Sakashita et al. | |
| 2022/0260003 A1* | 8/2022 | Oshima | ................... F01N 1/00 |
| 2023/0054896 A1* | 2/2023 | Sato | ....................... B32B 37/12 |

FOREIGN PATENT DOCUMENTS

| | | |
|---|---|---|
| CN | 111094116 | 5/2020 |
| CN | 111425287 | 7/2020 |
| JP | 2006-316705 | 11/2006 |
| JP | 2011-025768 | 2/2011 |
| JP | 2014-144740 | 8/2014 |
| JP | 2014144740 A * | 8/2014 |
| JP | 2016-153283 | 8/2016 |

OTHER PUBLICATIONS

Japanese Office Action for Japanese Patent Application No. 2021-021799 dated Jul. 26, 2022.

Chinese Office Action for Chinese Patent Application No. 202210116669.1 dated Mar. 22, 2023.

\* cited by examiner

VEHICLE REAR STRUCTURE

CROSS-REFERENCE TO RELATED APPLICATION

Priority is claimed on Japanese Patent Application No. 2021-021799, filed Feb. 15, 2021, the content of which is incorporated herein by reference.

BACKGROUND OF THE INVENTION

Field of the Invention

The present invention relates to a vehicle rear structure.

Description of Related Art

An exhaust finisher is known as a component of an exhaust system of a vehicle. The exhaust finisher is a tubular metal component provided at a terminating end portion of an exhaust pipe (a muffler) and is attached to a rear exterior member of a vehicle such as a rear bumper or a diffuser via a bracket (for example, see Japanese Unexamined Patent Application, First Publication No. 2011-025768).

SUMMARY OF THE INVENTION

A rear exterior member of a vehicle such as a rear bumper or a diffuser is usually made of a resin. For this reason, in the vehicle rear structure provided with the exhaust finisher, the exhaust finisher that is a heavy metal object is suspended and supported by a part of the resin rear exterior member. In this case, there is a concern that a part of the rear exterior member on which the load is concentrated will be flexibly deformed with usage over time.

An aspect according to the present invention has been made in consideration of such circumstances and an object thereof is to provide a vehicle rear structure in which an exhaust finisher can be attached to a rear exterior member without causing flexural deformation of the rear exterior member due to a load of the exhaust finisher.

In order to solve the above problems and achieve the above object, the present invention has adopted the following aspects.

(1) A vehicle rear structure according to one aspect of the present invention includes: a rear exterior member that is made of a resin and provided at a rear portion of a vehicle body; a metal exhaust finisher provided at a terminating end portion of an exhaust pipe; and a reinforcing block to which the exhaust finisher is fixed and which is attached to the rear exterior member, in which the reinforcing block includes: an upper side portion that straddles an upper portion of the exhaust finisher in a vehicle width direction; an inner side portion extending downward from an inner region of the upper side portion in the vehicle width direction; and an outer side portion extending downward from an outer region of the upper side portion in the vehicle width direction.

According to the above aspect (1), the metal exhaust finisher is attached to the rear exterior member via the reinforcing block from which the inner side portion and the outer side portion extend from an inner side and an outer side of the upper side portion in the vehicle width direction. Since the reinforcing block has an overall shape that surrounds the upper side, the inner side, and the outer side of the exhaust finisher, a load of the exhaust finisher can be distributed and supported over a wide area of the rear exterior member.

(2) In the above aspect (1), the exhaust finisher may be fixed to at least one point of each of the upper side portion, the inner side portion, and the outer side portion of the reinforcing block.

According to the above aspect (2), since the exhaust finisher is fixed to each of the upper side portion, the inner side portion, and the outer side portion of the reinforcing block, the load of the exhaust finisher can be supported by the rear exterior member in a well-balanced manner via the reinforcing block. Accordingly, in the case of adopting the present configuration, it is possible to prevent the load of the exhaust finisher from being concentrated on a part of the rear exterior member and causing flexural deformation of the part of the rear exterior member.

(3) In the above aspect (1), one of the inner side portion and the outer side portion of the reinforcing block that has at least a longer vertical extension length may be formed such that a cross-section thereof in a direction intersecting the extension direction is formed in substantially a U shape.

According to the above aspect (3), since the one of the inner side portion and the outer side portion that has at least a longer length in the extension direction is formed to have a substantially U-shaped cross-section, strength of the entire reinforcing block can be increased by the substantially U-shaped cross-section that is continuous therewith in the extension direction. Accordingly, in the case of adopting the present configuration, the reinforcing block can increase rigidity and strength of an attachment portion of the rear exterior member and further inhibit flexural deformation of the rear exterior member.

(4) In the above aspect (1), the rear exterior member may include a first exterior member and a second exterior member, which are separate components, and the reinforcing block may be configured such that an upper fixing portion fixed to the first exterior member is provided at at least one of the vicinity of an intersection between the upper side portion and the inner side portion and the vicinity of an intersection between the upper side portion and the outer side portion, and a lower fixing portion fixed to the second exterior member below the upper fixing portion may be provided at at least one of the vicinity of a lower end of the inner side portion and the vicinity of a lower end of the outer side portion.

According to the above aspect (4), the load of the exhaust finisher can be distributed and supported by the first exterior member and the second exterior member in a well-balanced manner via the upper fixing portion and the lower fixing portion of the reinforcing block. Accordingly, in the case of adopting the present configuration, it is possible to prevent the load from being concentrated on a part of the rear exterior member and causing the flexural deformation.

(5) In the above aspect (1), the rear exterior member may include a rear bumper, and a diffuser disposed to be continuous with a lower end of the rear bumper, and the reinforcing block may include a clamping portion that vertically clamps and supports a lower region of the rear bumper and an upper region of the diffuser.

According to the above aspect (5), since the lower region of the rear bumper and the upper region of the diffuser are clamped by the clamping portion of the reinforcing block, it is possible to inhibit generation of a gap between the rear bumper and the diffuser caused by receiving the load of the exhaust finisher.

(6) In the above aspect (1), the rear exterior member may have a substantially horizontal wall extending substantially horizontally toward a front side of the vehicle, and an inclined wall extending from a rear end portion of the substantially horizontal wall toward an upper rear side of the vehicle, the upper side portion of the reinforcing block may have a horizontal base portion superposed on an upper surface of the substantially horizontal wall and an inclined portion superposed on a front surface of the inclined wall, and the horizontal base portion and the inclined portion may be attached to the rear exterior member in a state in which they are superposed on the substantially horizontal wall and the inclined wall.

According to the above aspect (6), the load of the exhaust finisher acting on the upper side portion of the reinforcing block can be distributed and supported by the substantially horizontal wall and the inclined wall of the rear exterior member via the horizontal base portion and the inclined portion of the reinforcing block. For this reason, as compared with the case in which there is no superposed portion formed by the inclined portion and the inclined wall in the reinforcing block and the rear exterior member, it is possible to inhibit flexural deformation of the substantially horizontal wall of the rear exterior member due to the load of the exhaust finisher. In particular, since the inclined wall and the substantially horizontal wall of the rear exterior member that support the exhaust finisher via the reinforcing block can receive the load of the exhaust finisher in different directions, the flexural deformation of the substantially horizontal wall can be further inhibited.

(7) In the above aspect (1), a lower region of the exhaust finisher may be shaped such that its width narrows downward, the rear exterior member may have a side edge portion that is close to the lower region of the exhaust finisher and is formed along an inner side surface of the lower region of the exhaust finisher in the vehicle width direction or an outer side surface thereof in the vehicle width direction, and an extending end of the inner side portion or the outer side portion of the reinforcing block may be superposed on and fixed to the side edge portion of the rear exterior member.

According to the above aspect (7), a portion of the side edge portion of the rear exterior member that is close to the lower region of the exhaust finisher is reinforced by the extending end of the inner side portion or the outer side portion of the reinforcing block. For this reason, it is possible to inhibit flexural deformation of the side edge portion of the rear exterior member.

(8) In the above aspect (7), a locking claw may be provided to protrude near the lower end of the side edge portion of the rear exterior member, a fitting hole fitted to the locking claw may be formed at the extending end of the reinforcing block, and a slit may be formed at a position further from the lower region of the exhaust finisher than the fitting hole.

According to the above aspect (8), when the inner side portion or the outer side portion of the reinforcing block is attached to the side edge portion of the rear exterior member, the fitting hole formed at the extending end of the reinforcing block is fitted to the locking claw of the side edge portion of the rear exterior member. In this case, when another portion on the reinforcing block is first attached to the rear exterior member, it is difficult to fit the fitting hole of the reinforcing block to the locking claw, but in the present configuration, since the slit is formed at the extending end of the reinforcing block, a peripheral edge portion of the fitting hole can be deformed so that the fitting hole can be easily fitted to the locking claw.

According to the aspects of the present invention, the metal exhaust finisher is attached to the resin rear exterior member via the reinforcing block in which the inner side portion and the outer side portion extend from the inner side and the outer side of the upper side portion in the vehicle width direction. For that reason, the exhaust finisher can be attached to the rear exterior member without causing the flexural deformation of the rear exterior member due to the load of the exhaust finisher.

DETAILED DESCRIPTION OF THE INVENTION

Figure 1:
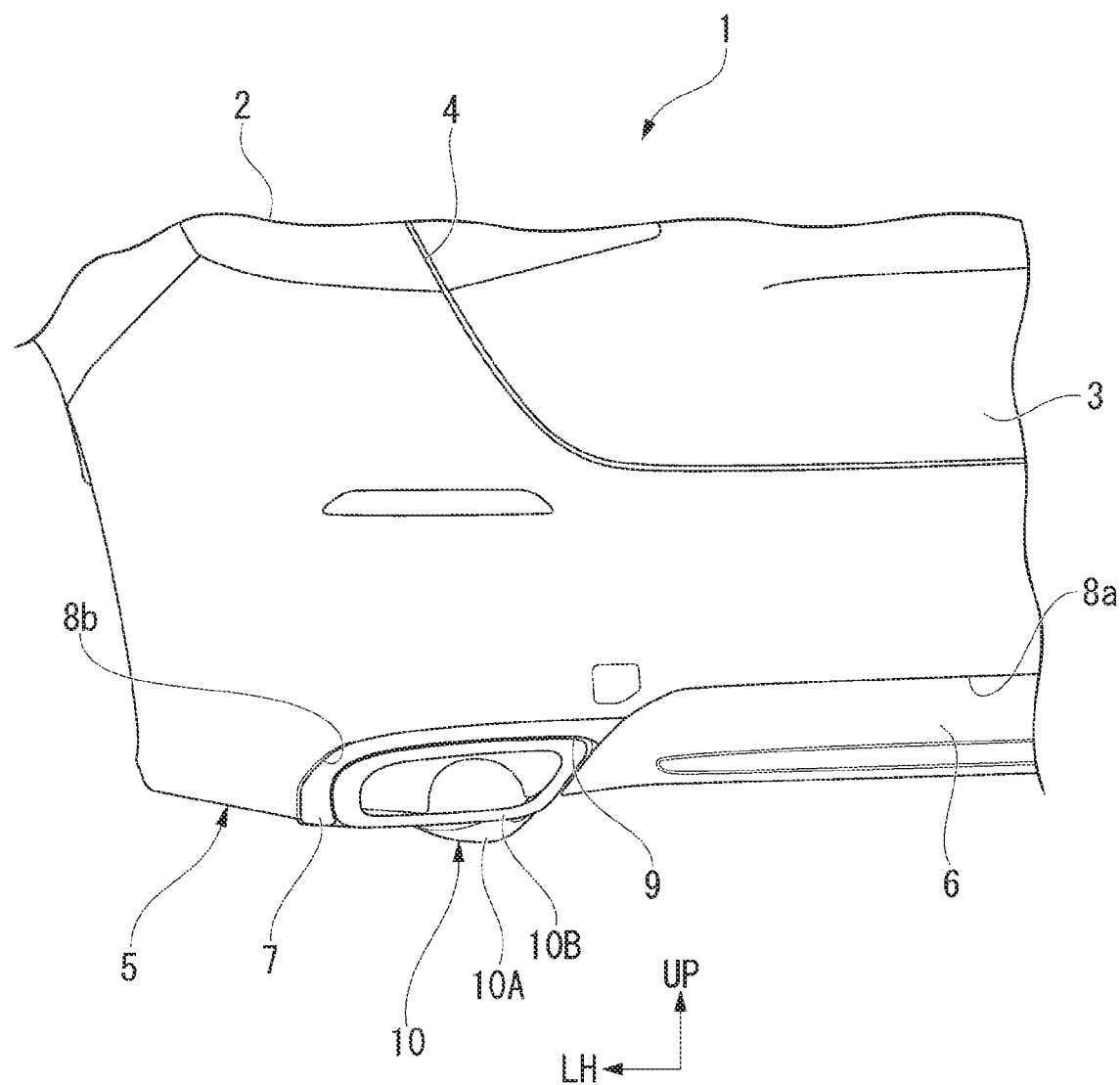
FIG. 1 is a front view of a vehicle rear portion according to an embodiment.

Embodiments of the present invention will be described below with reference to the drawings. At appropriate places in the drawings, an arrow FR indicating a forward direction with respect to a vehicle, an arrow UP indicating an upward direction with respect to the vehicle, and an arrow LH indicating a leftward direction with respect to the vehicle are shown.

FIG. 1 is a diagram of a rear portion of a vehicle 1 of the present embodiment from a rear side of the vehicle.

At the rear portion of the vehicle 1, a rear panel 2 that is a metal body panel at a rear portion of a vehicle body is disposed. The rear panel 2 is provided with a tailgate opening 4 in which a tailgate 3 that can be opened and closed is disposed. A resin rear bumper 5 is attached to a lower end of the rear panel 2. The rear bumper 5 extends to straddle a lower portion of the tailgate opening 4 in a vehicle width direction. A resin center diffuser 6 is attached to a central region of a lower end of the rear bumper 5 in the vehicle width direction, and a resin side diffuser 7 is attached to an outer portion of the center diffuser 6 at the lower end of the rear bumper 5 in the vehicle width direction. In FIG. 1, only a left side diffuser 7 is shown, but a similar side diffuser 7 is disposed on a right side of the center diffuser 6.

The center diffuser 6 is disposed in a center notch portion 8a provided at the lower end of the central region of the rear bumper 5 in the vehicle width direction to cover the notch portion 8a. The left and right side diffusers 7 are disposed in left and right notch portions 8b provided on both sides of the notch portion 8a at the lower end of the rear bumper 5 to cover the notch portions 8b.

In the present embodiment, the rear bumper 5, the center diffuser 6, and the left and right side diffusers 7 constitute a resin rear exterior member provided at the rear portion of the vehicle body. In the present embodiment, the rear bumper 5 constitutes a first exterior member, and the center diffuser 6 and the side diffusers 7 constitute a second exterior member.

The side diffusers 7 extend outward from side end portions of the center diffuser 6 in the vehicle width direction and then curve to extend downward from the vehicle. Exhaust opening portions 9 that open downward in substantially a U shape are formed between the center diffuser 6 and the left and right side diffusers 7. Metal exhaust finishers 10 are disposed in the exhaust opening portions 9.

Figure 2:
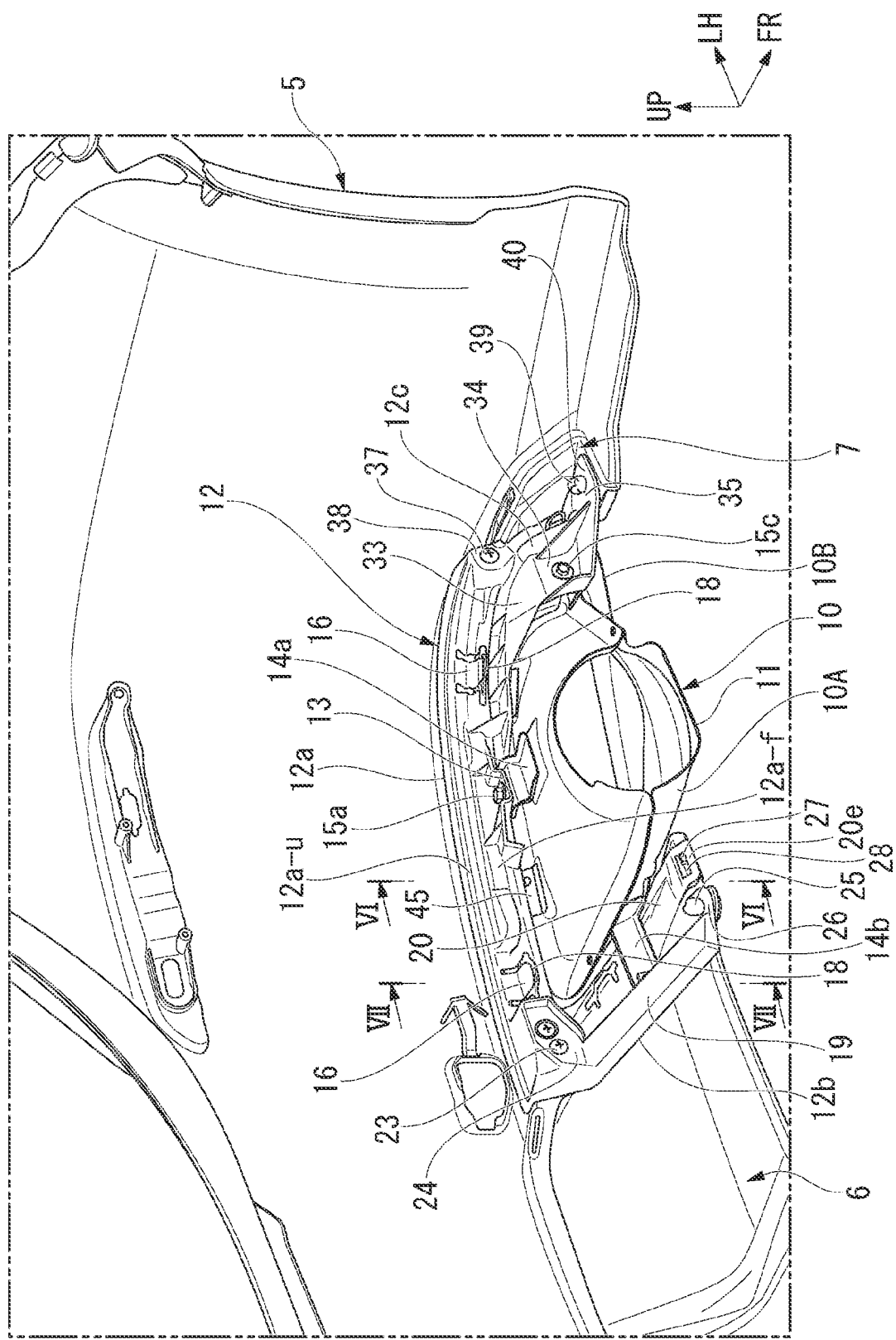
FIG. 2 is a perspective view showing an attachment portion of an exhaust finisher of the embodiment.

FIG. 2 is a perspective view from a front side of the vehicle with the exhaust finisher 10 removed from the vehicle body together with the rear bumper 5, the center diffuser 6, the side diffuser 7, and the like.

The exhaust finisher 10 includes a finisher body 10A (see FIG. 2) into which a terminating end portion of an exhaust pipe (a muffler) (not shown) is inserted from the front side of the vehicle, and a finisher cover 10B (see FIG. 1) integrally attached to a rear end side of the finisher body 10A. The finisher body 10A is configured of a metal cylinder having a substantially triangular shape in a top view, and a circular opening 11 into which the terminating end portion of the exhaust pipe is inserted is provided at a front end portion thereof. More specifically, the finisher body 10A is formed of a substantially elliptical metal cylinder, of which a width (a width in the vehicle width direction) increases from the front end portion toward the rear end side in a widened shape. A lower region of the finisher body 10A is shaped such that a width (a width in the vehicle width direction) gradually narrows downward. Similarly, an upper region of the finisher body 10A is shaped such that a width (a width in the vehicle width direction) gradually narrows upward.

As shown in FIG. 1, the finisher cover 10B is formed in a horizontally elongated rectangular frame shape and is exposed at the rear side of the vehicle through the exhaust opening portion 9 at the rear portion of the vehicle. The finisher cover 10B is made of a metal. The finisher cover 10B is integrally fixed to a rear end portion of the finisher body 10A and covers an end portion of the finisher body 10A on the rear side from the rear side of the vehicle.

The exhaust finisher 10 is fixed to a resin reinforcing block 12 and is attached to the rear exterior members such as the rear bumper 5, the center diffuser 6, or the side diffuser 7 via the reinforcing block 12.

Figure 3:
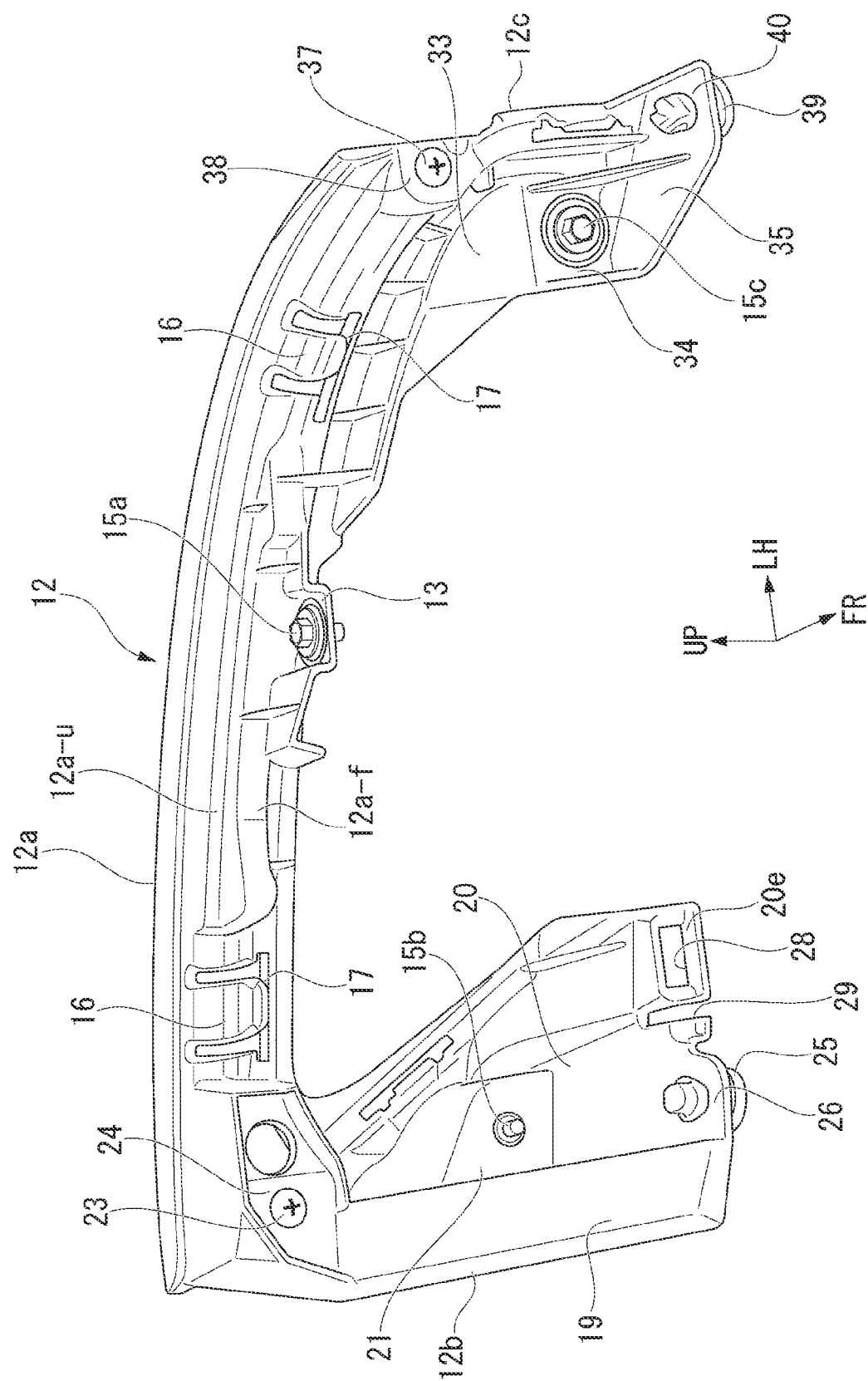
FIG. 3 is a perspective view of a reinforcing block of the embodiment.

FIG. 3 is a perspective view of the reinforcing block 12 from the front side of the vehicle.

The reinforcing block 12 has an upper side portion 12a that straddles an upper side of the exhaust finisher 10 in the vehicle width direction, an inner side portion 12b that extends downward from an inner region of the upper side portion 12a in the vehicle width direction, and an outer side portion 12c that extends downward from an outer region of the upper side portion 12a in the vehicle width direction. The upper side portion 12a extends substantially horizontally in the vehicle width direction. The inner side portion 12b extends to be downwardly inclined toward the front side of the vehicle to substantially follow a cross-sectional shape of a side portion of the center diffuser 6. The outer side portion 12c is formed to substantially follow a cross-sectional shape of a side edge portion of the side diffuser 7 on the outer side in the vehicle width direction.

Figure 4:
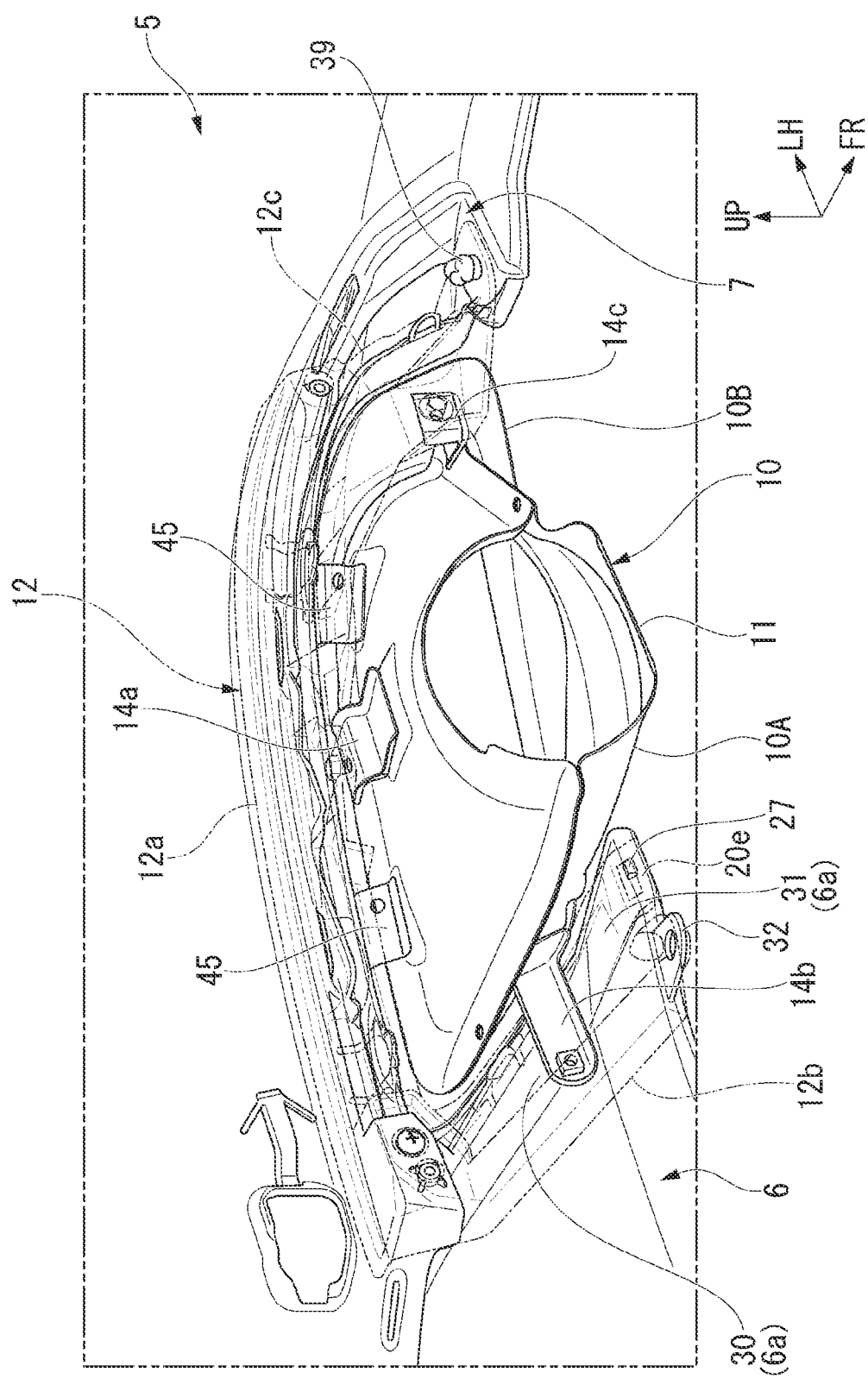
FIG. 4 is a perspective view showing the attachment portion of the exhaust finisher of the embodiment with the reinforcing block removed.
Figure 5:
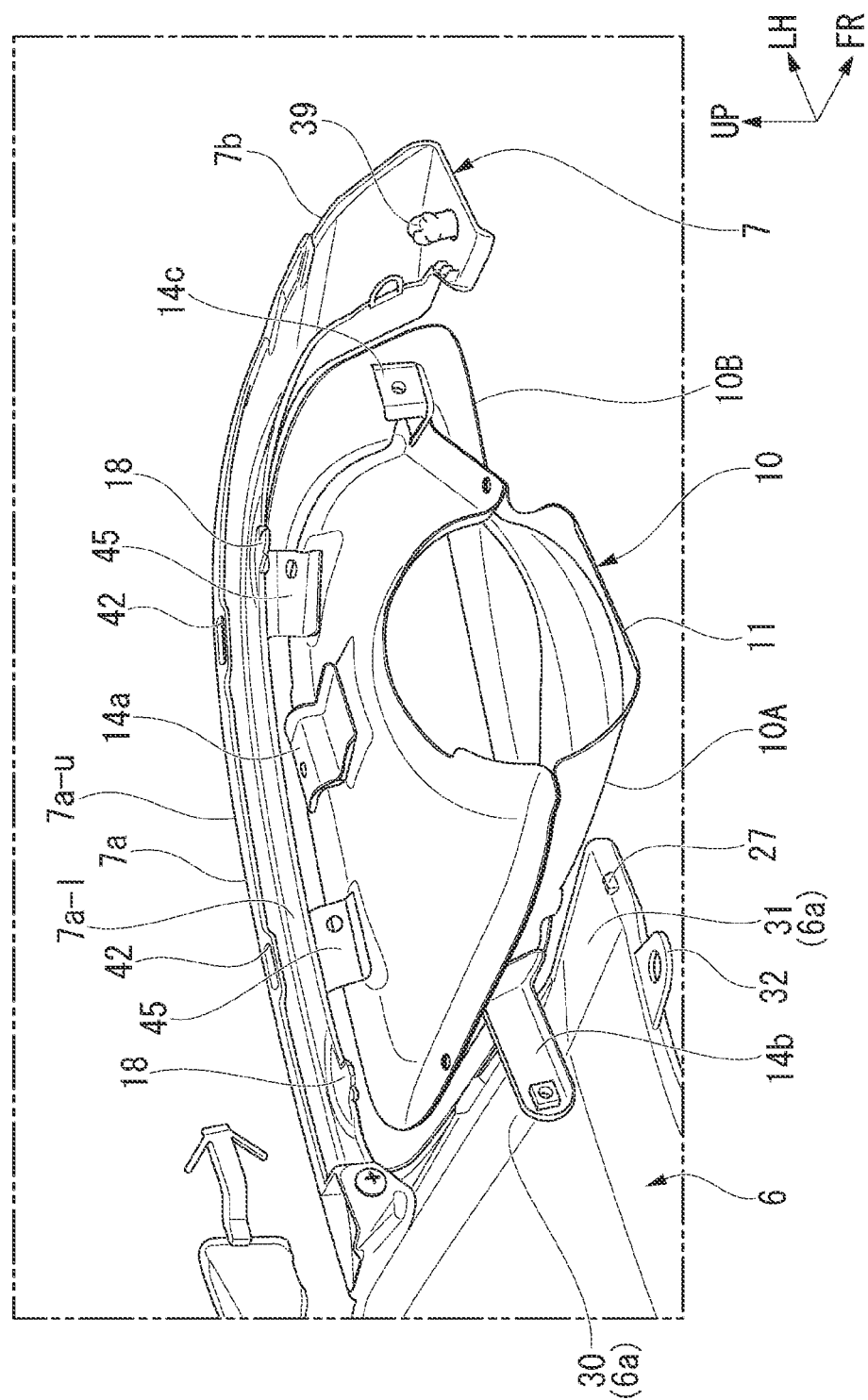
FIG. 5 is a perspective view showing the attachment portion of the exhaust finisher of the embodiment with the reinforcing block and a rear bumper removed.
Figure 6:
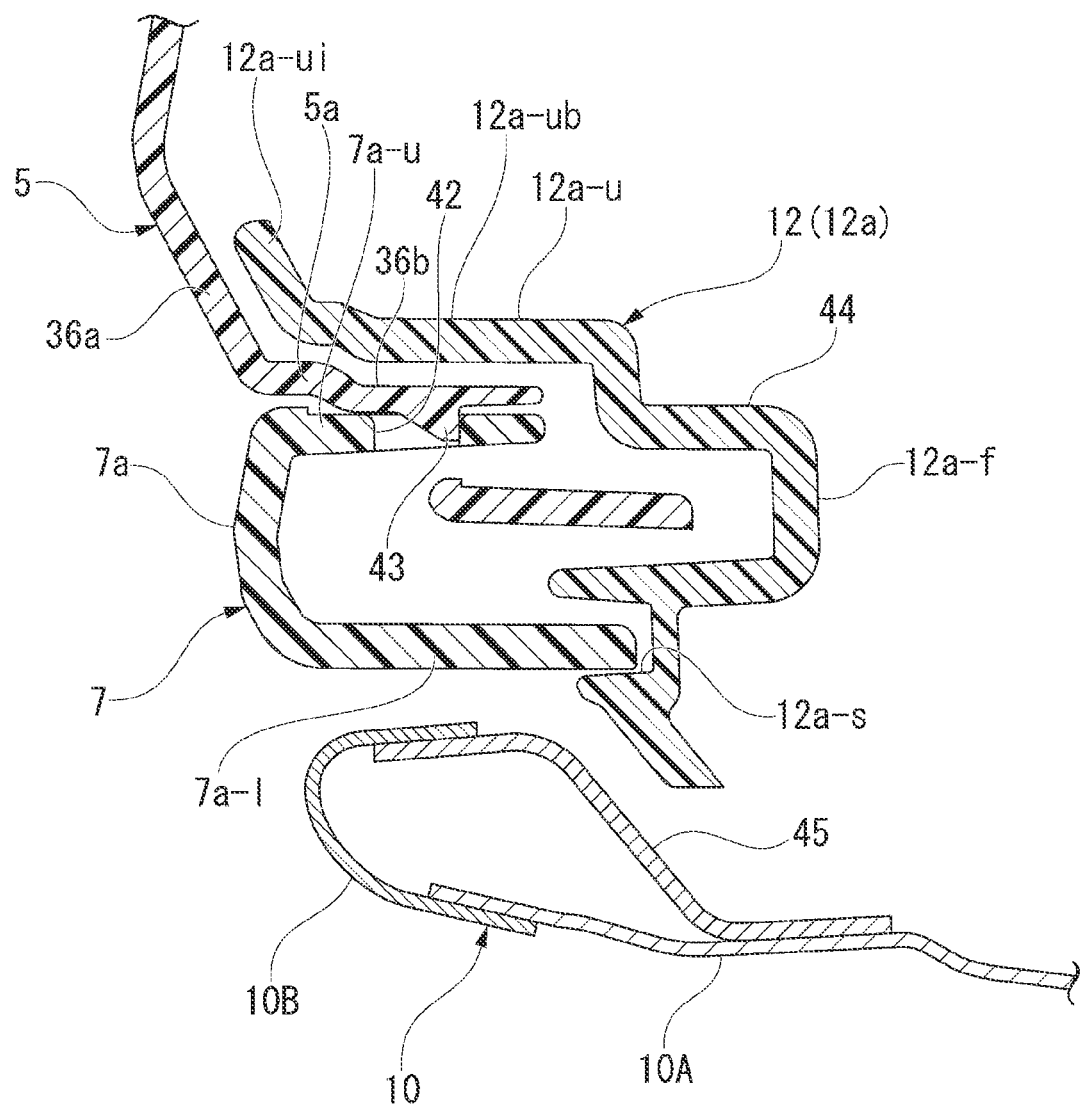
FIG. 6 is a cross-sectional view along line VI-VI in FIG. 2.

FIG. 4 is a perspective view similar to FIG. 2 in which the reinforcing block 12 is shown by a virtual line, and FIG. 5 is a perspective view similar to FIG. 2 from which the rear bumper 5 and the reinforcing block 12 are removed. FIG. 6 is a cross-sectional view along line VI-VI in FIG. 2, and FIG. 7 is a cross-sectional view along line VII-VII in FIG. 2.

Figure 7:
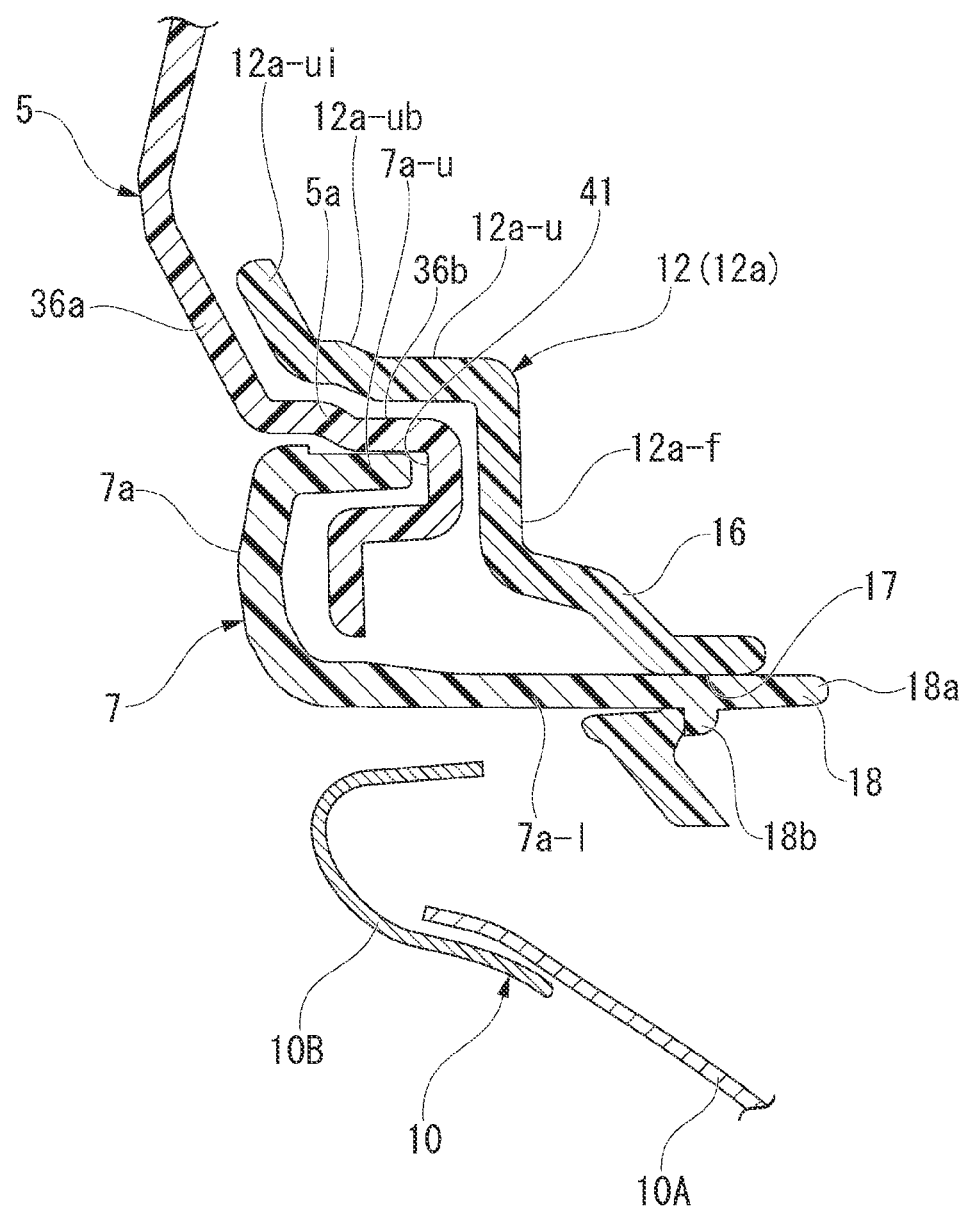
FIG. 7 is a cross-sectional view along line VII-VII in FIG. 2.

As shown in FIGS. 6 and 7, the upper side portion 12a of the reinforcing block 12 has a substantially horizontal upper wall 12a-u and a front wall 12a-f that bends downward and extends from a front end portion of the upper wall 12a-u, and the entire region thereof in the vehicle width direction is formed in a substantially L-shaped cross-sectional shape. As shown in FIG. 3, a connecting piece 13 extending toward the front side of the vehicle is integrally formed at a lower end of the front wall 12a-f at substantially a center of the upper side portion 12a in the vehicle width direction. As shown in FIGS. 4 and 5, the connecting piece 13 is fixed to a center bracket 14a welded and fixed to a center of an upper surface of the exhaust finisher 10 with a bolt 15a. Locking pieces 16 of which a lower side and left and right side portions are cut out in substantially a U shape are provided respectively at inner and outer portions of the front wall 12a-f of the upper side portion 12a in the vehicle width direction. The locking pieces 16 can be elastically displaced back and forth around their upper end portions. As shown in FIG. 7, slit-shaped insertion holes 17 are formed below the locking pieces 16 by parts of notches surrounding the locking pieces 16. Corresponding locking claws 18 of the side diffusers 7, which will be described later, are inserted into the insertion holes 17 from the rear side of the vehicle.

As shown in FIG. 3, the inner side portion 12b of the reinforcing block 12 includes a columnar portion 19 having a substantially U-shaped cross-section in a direction intersecting an extension direction thereof, and an inner extending portion 20 provided to extend from an outer portion of the columnar portion 19 in the vehicle width direction. The inner extending portion 20 extends diagonally downward toward a front portion of the vehicle along the columnar portion 19 from a portion connected with the upper side portion 12a, and a width (a width in the vehicle width direction) thereof gradually increases in a diagonally forward direction. That is, an extending amount of the inner extending portion 20 increases forward toward the exhaust finisher 10 side along a lower side surface of the exhaust finisher 10. A flat connecting wall 21 facing the front side of the vehicle is provided at substantially a center of the inner extending portion 20 in the vertical direction. An inner side bracket 14b welded and fixed to an inner side surface of the exhaust finisher 10 in the vehicle width direction is fastened and fixed to a front surface of the connecting wall 21 with a bolt 15b.

An upper fixing portion 24 fixed to an upper edge portion of the notch portion 8b of the rear bumper 5 with a screw 23 is provided near an intersection between the upper side portion 12a and the inner side portion 12b of the reinforcing block 12. A lower fixing portion 26 fixed to a lower end of an outer region of the center diffuser 6 in the vehicle width direction with a clip 25 is provided at a lower end of the inner extending portion 20 of the inner side portion 12b. A substantially rectangular fitting hole 28 into which the locking claw 27 provided to protrude from the lower end of the outer region of the center diffuser 6 in the vehicle width direction is fitted is formed at a portion of the inner extending portion 20 that protrudes toward the exhaust finisher 10 side further than the lower fixing portion 26. A slit 29 extending from the lower end over a predetermined length is formed between the lower fixing portion 26 and the fitting hole 28 in a lower end region of the inner extending portion 20. The slit 29 facilitates elastic deformation of a peripheral edge portion of the fitting hole 28 when the fitting hole 28 is fitted into the locking claw 27.

As shown in FIG. 5, a side edge portion 6a of the center diffuser 6 is formed along the inner side surface of the lower region of the exhaust finisher 10 in the vehicle width direction. An inclined wall 30 extending diagonally downward toward the front side of the vehicle, and an end flange 31 extending substantially horizontally from a lower end of the inclined wall 30 toward the front side of the vehicle are formed in the side edge portion 6a. The end flange 31 extends to come closer to the side surface of the lower region of the exhaust finisher 10. A holding piece 32 in which the clip 25 is held and the locking claw 27 described above are formed near a lower end of the side edge portion 6a of the center diffuser 6. The locking claw 27 is provided to protrude at a position separated outward in the vehicle width direction from the holding piece 32 at a lower end of the end flange 31. The locking claw 27 is formed to protrude upward by a predetermined height on an inclined surface (an inclined surface that is inclined downward toward the front side of the vehicle) at the lower end of the end flange 31.

The inner side portion 12b of the reinforcing block 12 is superposed on an upper surface of the inclined wall 30 and an upper surface of the end flange 31 at the side edge portion 6a of the center diffuser 6. A lower extending end 20e of the inner side portion 12b is fixed to be superposed on the side edge portion 6a of the center diffuser 6 due to locking of the clip 25 and locking of the locking claw 27 with the fitting hole 28 in that state.

As shown in FIG. 3, the outer side portion 12c of the reinforcing block 12 includes an inclined wall 33 extending diagonally downward from an outer end portion of the upper side portion 12a in the vehicle width direction toward the front side of the vehicle, a fastening wall 34 that bends downward and extends from a front end of the inclined wall 33, and an end flange 35 that bends and extends from a lower end of the fastening wall 34 toward the front side of the vehicle. The fastening wall 34 is fixed to an outer side bracket 14c (see FIGS. 4 and 5) welded and fixed to an outer portion of the exhaust finisher 10 in the vehicle width direction with a bolt 15c.

Accordingly, the exhaust finisher 10 is fixed to one point of each of the upper side portion 12a, the inner side portion 12b, and the outer side portion 12c of the reinforcing block 12. However, the number of fixed points of the exhaust finisher 10 to each of the upper side portion 12a, the inner side portion 12b, and the outer side portion 12c may be two or more.

The upper fixing portion 38 fixed by a screw 37 is provided at an upper edge portion of the notch portion 8b (see FIG. 1) below the side portion of the rear bumper 5 near the intersection between the upper side portion 12a and the outer side portion 12c of the reinforcing block 12. The lower fixing portion 40 fixed by a clip 39 to the rear bumper 5 and a lower edge portion of the side diffuser 7 on the outer side in the vehicle width direction is provided on the end flange 35 of the outer side portion 12c.

Here, the inner side portion 12b and the outer side portion 12c of the reinforcing block 12 have different extension lengths from the upper side portion 12a, and the extension length of the inner side portion 12b is longer than the extension length of the outer side portion 12c. In the present embodiment, as described above, the columnar portion 19 in which the substantially U-shaped cross-section continuously extends is provided on the inner side portion 12b having the longer extension length. The reinforcing block 12 maintains high rigidity and strength as a whole due to the columnar portion 19 of the inner side portion 12b having the longer extension length.

As shown in FIG. 5, the side diffuser 7 has an upper side portion 7a extending outward in the vehicle width direction from the side portion of the center diffuser 6, and a side portion 7b extending to a front rear side of the vehicle while curving from an outer end portion of the upper side portion 7a in the vehicle width direction. As shown in FIGS. 6 and 7, the upper side portion 7a is formed in a substantially U-shaped cross-sectional shape to open toward the front side of the vehicle. A pair of the locking claws 18 mentioned above are provided on a lower wall 7a-1 of the upper side portion 7a. As shown in FIG. 7, each locking claw 18 has a protruding piece 18a that protrudes toward the front side of the vehicle, and a claw body portion 18b that protrudes downward from a base portion of the protruding piece 18a. Each locking claw 18 is inserted into the corresponding insertion hole 17 of the reinforcing block 12 from a tip portion of the protruding piece 18a, and the claw body portion 18b passes over the insertion hole 17 and engages with a lower edge portion of the insertion hole 17. As a result, the side diffuser 7 prevents the upper side portion 12a of the reinforcing block 12 from falling off.

As shown in FIG. 7, a lower edge portion 5a of the rear bumper 5 (an upper edge portion of the notch portion 8b on the side portion) is provided with an inclined wall 36a that is inclined downward toward the front side of the vehicle, a substantially horizontal wall 36b that is connected to a lower end of the inclined wall 36a and extends to the front side of the vehicle, and a recessed groove 41 that is connected to the substantially horizontal wall 36b and holds an upper wall 7a-u of the upper side portion 7a of the side diffuser 7 from the front side of the vehicle. In other words, the inclined wall 36a of the rear bumper 5 extends from a rear end portion of the substantially horizontal wall 36b toward the upper rear side of the vehicle.

As shown in FIGS. 5 and 6, a pair of locking holes 42 are provided on the upper wall 7a-u of the side diffuser 7 to be separated from each other in the vehicle width direction. A locking claw 43 that is inserted into each locking hole 42 of the upper wall 7a-u of the side diffuser 7 from above and engaged (see FIG. 6) is formed on the lower edge portion 5a (substantially horizontal wall 36b) of the rear bumper 5.

As shown in FIG. 6, a clamping portion 44, which vertically clamps and supports the lower region (lower edge portion 5a) of the rear bumper 5 and the upper region (upper side portion 7a) of the side diffuser 7, is provided in the upper side portion 12a of the reinforcing block 12. The clamping portion 44 is configured of the upper wall 12a-u of the upper side portion 12a, the front wall 12a-f, and a recessed groove 12a-s provided at a lower end of the front wall 12a-f. The recessed groove 12a-s opens to the rear side of the vehicle and engages with a front end portion of the lower wall 7a-1 of the side diffuser 7. The clamping portion 44 superposes the upper wall 12a-u of the upper side portion 12a on the upper surface of the lower edge portion 5a (mainly the substantially horizontal wall 36b) of the rear bumper 5, causes the recessed groove 12a-s to fit into the lower wall 7a-1 of the side diffuser 7, and thus can vertically clamp the lower region of the rear bumper 5 and the upper region of the side diffuser 7.

Reference numeral 45 shown in FIG. 6 and other figures is a metal connecting bracket for connecting the finisher body 10A of the exhaust finisher 10 to the finisher cover 10B.

As shown in FIGS. 6 and 7, the upper wall 12a-u of the upper side portion 12a of the reinforcing block 12 has an upper wall body portion 12a-ub (a horizontal base portion) that extends substantially horizontally in a front to rear direction of the vehicle, and an inclined portion 12a-ui extending diagonally upward from a rear end portion of the upper wall body portion 12a-ub. The upper wall body portion 12a-ub (horizontal base portion) is superposed on the upper surface of the substantially horizontal wall 36b of the lower edge portion 5a of the rear bumper 5 and the inclined portion 12a-ui is superposed on the inclined wall 36a of the rear bumper 5 from the front side of the vehicle. The upper side portion 12a of the reinforcing block 12 is attached to the rear bumper 5 in this state.

<Assembly of Exhaust Finisher 10>

The exhaust finisher 10 is assembled to the rear bumper 5, the center diffuser 6, the side diffusers 7, and the like as follows.

First, the exhaust finisher 10 is coupled to the upper side portion 12a, the inner side portion 12b, and the outer side portion 12c of the reinforcing block 12 via the center bracket 14a, the inner side bracket 14b, and the outer side bracket 14c. Hereinafter, the structure assembled in this way will be referred to as a "finisher assembly."

On the other hand, the center diffuser 6 and the side diffusers 7 are fixed to the rear bumper 5 by clipping, screwing, or the like. Hereinafter, the structure assembled in this way is referred to as an "exterior assembly."

Next, the finisher assembly is aligned with the exterior assembly from the front side of the vehicle, the corresponding locking claws 18 of the side diffusers 7 are inserted into the left and right insertion holes 17 of the upper side portion 12a of the reinforcing block 12, and a position of the upper side portion 12a is fixed by the locking claws 18.

After that, the inner side portion 12b of the reinforcing block 12 is superposed on the side edge portion 6a of the center diffuser 6, and the outer side portion 12c is superposed on the side edge portions of the side diffusers 7. In this case, a position of the lower end of the inner side portion 12b is fixed by engaging the locking claw 27 with the fitting hole 28.

After that, the left and right upper fixing portions 24 and 38 of the reinforcing block 12 are fixed to the lower edge portion of the rear bumper 5 with the screws 23 and 37, and the left and right lower fixing portions 26 and 40 are fixed to the lower end of the side edge portion 6a of the center diffuser 6 and the lower end of the side portion 7b of the side diffuser 7 with the clips 25 and 39.

In this way, the exterior assembly to which the finisher assembly is assembled is finally attached to the rear panel 2 of the vehicle body.

Effects of Embodiment

As described above, in the vehicle rear structure of the present embodiment, the metal exhaust finisher 10 is attached to the resin rear exterior member (the rear bumper 5, the center diffuser 6, and the side diffusers 7) via the reinforcing block 12 in which the inner side portion 12b and the outer side portion 12c extend from the inner side and the outer side of the upper side portion 12a in the vehicle width direction. For this reason, a load of the exhaust finisher 10 can be distributed and supported over a wide range of the rear exterior member, and it is possible to prevent flexural deformation of the rear exterior member due to the load of the exhaust finisher 10.

In the vehicle rear structure of the present embodiment, since the exhaust finisher 10 is fixed to at least one point of each of the upper side portion 12a, the inner side portion 12b, and the outer side portion 12c of the reinforcing block 12, the load of the exhaust finisher 10 can be supported by the rear exterior members (the rear bumper 5, the center diffuser 6, the side diffusers 7) in a well-balanced manner via the reinforcing block 12. Accordingly, in the case of adopting the vehicle rear structure of the present embodiment, it is possible to further inhibit the load of the exhaust finisher 10 from being concentrated on a part of the rear exterior member and causing flexural deformation of the part of the rear exterior member.

In the vehicle rear structure of the present embodiment, the inner side portion 12b of the reinforcing block 12, which has the longer extension length in the vertical direction, includes the columnar portion 19 having the substantially U-shaped cross-section in the direction intersecting the extension direction. For this reason, the strength of the entire reinforcing block 12 can be efficiently increased by the substantially U-shaped cross-section of the columnar portion 19. Accordingly, in the case of adopting the vehicle rear structure of the present embodiment, the rigidity and strength of an attachment portion of the rear exterior member (center diffuser 6) can be increased by the reinforcing block 12, and the flexural deformation of the rear exterior member can be further inhibited.

In the present embodiment, the extension length of the inner side portion 12b is set to be longer than the extension length of the outer side portion 12c, but in a case in which the extension length of the outer side portion 12c is longer than the extension length of the inner side portion 12b, a cross-section of the outer side portion 12c in the direction intersecting the extension direction may be substantially a U shape. For both of the inner side portion 12b and the outer side portion 12c, the cross-sections in the direction intersecting the extension direction may be substantially U shapes.

Further, in the vehicle rear structure of the present embodiment, the upper fixing portion 24 fixed to the rear bumper 5, which is the first exterior member, is provided near the intersection between the upper side portion 12a and the inner side portion 12b of the reinforcing block 12, and the lower fixing portion 26 fixed to the center diffuser 6, which is the second exterior member, is provided near the lower end of the inner side portion 12b. For this reason, the load of the exhaust finisher 10 can be distributed and supported by the rear bumper 5 and the center diffuser 6 in a well-balanced manner via the upper fixing portion 24 and the lower fixing portion 26 of the reinforcing block 12.

In the present embodiment, the inner side portion 12b of the reinforcing block 12 is attached to straddle between the rear bumper 5 and the center diffuser 6, but the inner side portion 12b of the reinforcing block 12 may be attached to straddle between the side diffuser 7 and the center diffuser 6.

In the present embodiment, the upper fixing portion 38 fixed to the rear bumper 5, which is the first exterior member, is provided near the intersection between the upper side portion 12a and the outer side portion 12c of the reinforcing block 12, and the lower fixing portion 40 fixed to the side diffuser 7, which is the second exterior member, is provided near the lower end of the outer side portion 12c. For this reason, the load of the exhaust finisher 10 can be distributed and supported by the rear bumper 5 and the side diffuser 7 in a well-balanced manner via the upper fixing portion 38 and the lower fixing portion 40 of the reinforcing block 12.

Accordingly, in the case of adopting the vehicle rear structure of the present embodiment, it is possible to further inhibit the load of the exhaust finisher 10 from being concentrated on a part of the center diffuser 6, the side diffuser 7, and the rear bumper 5 and causing the flexural deformation.

In the vehicle rear structure of the present embodiment, the reinforcing block 12 includes the clamping portion 44 that vertically clamps and supports the lower region of the rear bumper 5 and the upper region of the side diffuser 7. For this reason, when the load of the exhaust finisher 10 acts on the side diffuser 7, the clamping portion 44 can prevent the side diffuser 7 from being separated downward from the rear bumper 5 by receiving the load of the exhaust finisher 10. Accordingly, in the case of adopting the present configuration, it is possible to inhibit generation of a gap between the rear bumper 5 and the side diffuser 7 and improve quality of an exterior shape of the vehicle.

Further, in the vehicle rear structure of the present embodiment, the substantially horizontal wall 36b extending substantially horizontally toward the front side of the vehicle and the inclined wall 36a extending from the rear end portion of the substantially horizontal wall 36b toward the upper side of the rear portion of the vehicle are formed on the lower edge portion of the rear bumper 5, which is the rear exterior member. The upper wall body portion 12a-ub (horizontal base portion) superposed on the upper surface of the substantially horizontal wall 36b of the rear bumper 5 and the inclined portion 12a-ui superposed on the front surface of the inclined wall 36a of the rear bumper 5 are formed on the upper side portion 12a of the reinforcing block 12. In addition, the upper side portion 12a of the reinforcing block 12 is attached to the rear bumper 5 in a state in which the upper wall body portion 12a-ub (horizontal base portion) and the inclined portion 12a-ui are superposed on the substantially horizontal wall 36b and the inclined wall 36a of the rear bumper 5.

For this reason, the load of the exhaust finisher 10 acting on the upper side portion 12a of the reinforcing block 12 can be distributed and supported by the substantially horizontal wall 36b and the inclined wall 36a of the rear bumper 5 via the upper wall body portion 12a-ub (horizontal base portion) and the inclined portion 12a-ui of the reinforcing block 12. Accordingly, as compared with the case in which there is no superposed portion between the inclined portion 12a-ui and the inclined wall 36a in the reinforcing block 12 and the rear bumper 5, it is possible to inhibit flexural deformation of the substantially horizontal wall 36b of the rear bumper 5 due to the load of the exhaust finisher 10. In particular, since the inclined wall 36a and the substantially horizontal wall 36b of the rear bumper 5 that support the exhaust finisher 10 via the reinforcing block 12 can receive the load of the exhaust finisher 10 in different directions, it is possible to further inhibit the flexural deformation of the substantially horizontal wall 36b.

In the vehicle rear structure of the present embodiment, the side edge portion 6a of the center diffuser 6 is provided with the inclined wall 30 that extends diagonally downward toward the front side of the vehicle and the end flange 31 that extends substantially horizontally toward the front side of the vehicle from the lower end of the inclined wall 30. The inner side portion 12b of the reinforcing block 12 is attached to the side edge portion 6a along the upper surface of the inclined wall 30 and the upper surface of the end flange 31.

For this reason, the load of the exhaust finisher 10 can be distributed and supported by the inclined wall 30 of the center diffuser 6 and the end flange 31 via the reinforcing block 12. Accordingly, in the case of adopting the present configuration, it is possible to prevent flexural deformation of the end flange 31 due to the load of the exhaust finisher 10.

Further, in the present configuration, since the inclined wall 30 and the end flange 31 can receive the load of the exhaust finisher 10 in different directions, the flexural deformation of the end flange 31 can be further inhibited. In the present embodiment, the side edge portion of the center diffuser 6 is provided along the inner side surface of the exhaust finisher 10 in the vehicle width direction, but in the case of a vehicle in which the side edge portion of the diffuser is provided along an outer side surface of the exhaust finisher 10 in the vehicle width direction, the inclined wall and the end flange may be similarly provided on the side edge portion of the diffuser, and the outer side portion 12c of the reinforcing block 12 may be similarly attached to the outer side edge portion. In this case as well, the same effect as described above can be obtained.

In the vehicle rear structure of the present embodiment, the side edge portion 6a of the center diffuser 6 is provided along the inner side surface of the exhaust finisher 10 in the vehicle width direction, and the end flange 31 that extends to come closer to the lower region of the exhaust finisher 10 is formed on the side edge portion 6a. In addition, the extending end of the inner side portion 12b of the reinforcing block 12 is superposed on and fixed to the end flange 31. For this reason, the end flange 31 formed on the side edge portion 6a of the center diffuser 6 can be reinforced by the inner side portion 12b of the reinforcing block 12. Accordingly, in the case of adopting the configuration, it is possible to further inhibit flexural deformation of the side edge portion 6a of the center diffuser 6.

In the case of a vehicle of which the side edge portion is provided with the diffuser along the outer side surface of the exhaust finisher in the vehicle width direction, the outer side portion 12c of the reinforcing block 12 may be superposed on and fixed to the end flange of the side edge portion of the diffuser. In this case as well, the same effect as described above can be obtained.

Further, in the vehicle rear structure of the present embodiment, the locking claw 27 is provided to protrude near the lower end of the side edge portion 6a of the center diffuser 6, which is the rear exterior member, and the fitting hole 28 fitted to the locking claw 27 is formed at the extending end 20e of the inner side portion 12b of the reinforcing block 12. In addition, the slit 29 is formed at the extending end 20e of the reinforcing block 12 at a position separated from the lower region of the exhaust finisher 10 than the fitting hole 28. For this reason, when the inner side portion 12b of the reinforcing block 12 is attached to the side edge portion 6a of the center diffuser 6, the fitting hole 28 of the extending end 20e of the inner side portion 12b can be easily fitted to the locking claw 27 of the side edge portion 6a of the center diffuser 6 even in a state in which the upper side portion 12a of the reinforcing block 12 is first attached to the locking claw 18 of the side diffuser 7. That is, since the slit 29 is formed at the extending end 20e of the inner side portion 12b at the position separated from the lower region of the exhaust finisher 10 than the fitting hole 28, the peripheral edge portion of the fitting hole 28 of the extending end 20e can be flexibly deformed, and the fitting hole 28 can be easily fitted to the locking claw 27.

Accordingly, in the case of adopting the present configuration, workability of assembling the reinforcing block 12 (finisher assembly) to the rear exterior member (exterior assembly) can be improved.

The present invention is not limited to the above embodiment, and various changes in design can be made without departing from the gist thereof.

What is claimed is:

1. A vehicle rear structure comprising:
a rear exterior member that is made of a resin and provided at a rear portion of a vehicle body;
a metal exhaust finisher provided at a terminating end portion of an exhaust pipe; and
a reinforcing block to which the exhaust finisher is fixed and which is attached to the rear exterior member,
wherein the reinforcing block includes:
an upper side portion that straddles an upper portion of the exhaust finisher in a vehicle width direction;
an inner side portion extending downward from an inner region of the upper side portion in the vehicle width direction; and
an outer side portion extending downward from an outer region of the upper side portion in the vehicle width direction,
wherein one of the inner side portion and the outer side portion of the reinforcing block that has at least a longer vertical extension length is formed such that a cross-section thereof in a direction intersecting the extension direction is formed in substantially a U shape.

2. The vehicle rear structure according to claim 1, wherein the exhaust finisher is fixed to at least one point of each of the upper side portion, the inner side portion, and the outer side portion of the reinforcing block.

3. A vehicle rear structure comprising:
a rear exterior member that is made of a resin and provided at a rear portion of a vehicle body;
a metal exhaust finisher provided at a terminating end portion of an exhaust pipe; and
a reinforcing block to which the exhaust finisher is fixed and which is attached to the rear exterior member,
wherein the reinforcing block includes:
an upper side portion that straddles an upper portion of the exhaust finisher in a vehicle width direction;
an inner side portion extending downward from an inner region of the upper side portion in the vehicle width direction; and
an outer side portion extending downward from an outer region of the upper side portion in the vehicle width direction,
wherein the rear exterior member includes a first exterior member and a second exterior member, which are separate components, and
the reinforcing block is configured such that an upper fixing portion fixed to the first exterior member is provided at at least one of the vicinity of an intersection between the upper side portion and the inner side portion and the vicinity of an intersection between the upper side portion and the outer side portion, and a lower fixing portion fixed to the second exterior member below the upper fixing portion is provided at at least one of the vicinity of a lower end of the inner side portion and the vicinity of a lower end of the outer side portion.

4. The vehicle rear structure according to claim 3, wherein the exhaust finisher is fixed to at least one point of each of the upper side portion, the inner side portion, and the outer side portion of the reinforcing block.

5. A vehicle rear structure comprising:
a rear exterior member that is made of a resin and provided at a rear portion of a vehicle body;
a metal exhaust finisher provided at a terminating end portion of an exhaust pipe; and
a reinforcing block to which the exhaust finisher is fixed and which is attached to the rear exterior member,
wherein the reinforcing block includes:
an upper side portion that straddles an upper portion of the exhaust finisher in a vehicle width direction;
an inner side portion extending downward from an inner region of the upper side portion in the vehicle width direction; and
an outer side portion extending downward from an outer region of the upper side portion in the vehicle width direction,
wherein the rear exterior member includes a substantially horizontal wall extending substantially horizontally toward a front side of the vehicle, and an inclined wall extending from a rear end portion of the substantially horizontal wall toward an upper rear side of the vehicle,
the upper side portion of the reinforcing block includes a horizontal base portion superposed on an upper surface of the substantially horizontal wall and an inclined portion superposed on a front surface of the inclined wall, and
the horizontal base portion and the inclined portion are attached to the rear exterior member in a state in which they are superposed on the substantially horizontal wall and the inclined wall.

6. The vehicle rear structure according to claim 5, wherein the exhaust finisher is fixed to at least one point of each of the upper side portion, the inner side portion, and the outer side portion of the reinforcing block.

7. A vehicle rear structure comprising:
a rear exterior member that is made of a resin and provided at a rear portion of a vehicle body;
a metal exhaust finisher provided at a terminating end portion of an exhaust pipe; and
a reinforcing block to which the exhaust finisher is fixed and which is attached to the rear exterior member,
wherein the reinforcing block includes:
an upper side portion that straddles an upper portion of the exhaust finisher in a vehicle width direction;
an inner side portion extending downward from an inner region of the upper side portion in the vehicle width direction; and
an outer side portion extending downward from an outer region of the upper side portion in the vehicle width direction,
wherein a lower region of the exhaust finisher is shaped such that its width narrows downward,
the rear exterior member includes a side edge portion that is close to the lower region of the exhaust finisher and is formed along an inner side surface of the lower region of the exhaust finisher in the vehicle width direction or an outer side surface thereof in the vehicle width direction,
an extending end of the inner side portion or the outer side portion of the reinforcing block is superposed on and fixed to the side edge portion of the rear exterior member,
a locking claw is provided to protrude near the lower end of the side edge portion of the rear exterior member,
a fitting hole fitted to the locking claw is formed at the extending end of the reinforcing block, and a slit is formed at a position further from the lower region of the exhaust finisher than the fitting hole.

8. The vehicle rear structure according to claim 7, wherein the exhaust finisher is fixed to at least one point of each of the upper side portion, the inner side portion, and the outer side portion of the reinforcing block.

* * * * *